UNITED STATES PATENT OFFICE 2,644,750

PAPER MAKING PROCESS UTILIZING MODIFIED LOCUST BEAN GUM

Nat Frisch, White Plains, and Frank J. Sweeney, Forest Hills, N. Y., assignors to Stein, Hall & Company, Inc., New York, N. Y., a corporation of New York No Drawing. Application June 26, 1951, Serial No. 233,696

3 Claims. (Cl. 92—21)

The present invention relates to an improvement in the process of making paper.

This application is a continuation-in-part of application Serial No. 65,717, filed December 16, 1948.

Many attempts have been made in the past to speed up the paper making process and to increase the strength of the paper formed thereby. Thus, for example, it has been proposed to incorporate into the paper stock locust bean gum or flour prepared from the seed endosperm of the locust or carob tree (Ceratonia siliqua), a perennial legume native to the Mediterranean region. The fruit of this tree is in the form of pods. It was known to the ancients as manna and in later periods has been known as St. John's bread. The gum powder generally known as locust bean gum is obtained from the seeds in these pods and has been utilized heretofore as a film forming material in textile sizing and as a thickening agent in printing and dyeing.

It is known that the addition of locust bean gum to paper stock will result in paper having improved wet and dry strength characteristics. The use of locust bean gum in the manufacture of paper has, however, been discouraged due to the considerable difficulty involved in uniformly distributing the locust bean gum throughout the aqueous furnish. Even when special equipment in the form of injectors and high speed stirrers is used and the locust bean gum is added slowly to water, an appreciable proportion of the locust bean gum will remain in the form of lumps even after cooking. If these lumps get into the sheet they cause "fisheyes" and later cause a breakdown in the sheet. Special equipment must therefore be untilized to strain out these lumps, which incidentally result in a waste of locust bean gum, and the tanks in which the gum is mixed and cooked must frequently be drained and cleaned. The additional equipment required and the precautions that must be followed in order to incorporate locust bean gum in paper stock have substantially offset the advantages obtained by use of the gum with the result that the use of locust bean gum in the paper industry has not become widespread.

It has now been found that conventional paper making operations can be materially improved by adding to the aqueous suspension of fibers, normally referred to as the furnish, at a point after all operations designed to substantially modify the fibrous constituents by mechanical means are completed and prior to the formation of the web, i. e., preferably at the head box, fan pump or stock regulator box, an aqueous solution of a combination of locust bean gum, a sodium borate and an acid material selected from the group consisting of glyoxal, pyruvic aldehyde, ammonium chloride, citric acid, boric acid and aluminum sulfate prepared preferably by the cooking operations subsequently disclosed. This method avoids the difficulties involved in adding straight locust bean gum to the furnish, significantly improves the paper making process and results in improving the characteristics of the paper produced thereby.

The aqueous solution of a combination of locust bean gum, borate and an acid material can be prepared with utmost facility in any one of a number of ways. A dry mixture of locust bean gum, borate and acid material may be dispersed readily in cold water or a dry mixture of locust bean gum and borate may first be dispersed in cold water and the acid material added to the aqueous dispersion so formed. Neither of these methods results in the formation of objectionable lumps and the complete dispersion of the materials can be accomplished in a matter of seconds. The dispersion is then cooked at an elevated temperature of the order of about 165° F. to 212° F., preferably about 200° F. to "open," swell or gelatinize the locust bean gum and thereby form a clear and viscous aqueous solution.

Tests have shown that in a sheet into which this material has been incorporated, an improvement in formation results, and also that the addition of the material of this invention results in a general improvement in the quality of paper produced from a given stock. The utilization of this invention, for example, has made it possible to increase the capacity of a mill having limited drying facilities without reduction in salient properties by making it possible to use stock of increased freeness thereby permitting a greater amount of water to drain from the web during passage over the wire prior to drying. Also the capacity of a mill to produce a uniformly good quality paper has been increased in view of the improved web formation from mediocre or poor stock. Thus, for example, it has been found that the method of adding a combination of locust bean gum, borate and acid material to the furnish makes it possible to reduce the proportion of relatively expensive sulfite pulp and increase the proportion of relatively inexpensive groundwood without deleteriously affecting the characteristics of the paper produced thereby or slowing down the speed of the web. Normally such standard final quality could be obtained only by a relatively slow operation. In connection with mill operations having good drying capacity and utilizing relatively good starting stock, it has been found that lower drying temperatures or increased speeds are possible with attendant savings while attaining the same or greater amount of production and the same or improved quality of final product.

Changes in the proportions of the critical ingredients used in the combination have considerable effect upon the results obtained in so far as handling and dispersibility are concerned. As the proportion of locust bean gum in the combination is decreased, the ease with which it can be dispersed in water is increased. On the other hand, as the proportion of locust bean gum in the combination approaches 100%, it becomes more difficult to disperse in water and more liable to form lumps that must be strained out prior to the addition of the solution to the furnish. As a practical matter, the presence of less than about 50% locust bean gum in the combination is too little to obtain the full benefits derived from its use and the presence of more than about 96% of the gum will result in sufficient dispersing difficulties to make its use uneconomical. It is generally preferred therefore to limit the proportion of locust bean gum in the combination to between about 65% and 93%. Optimum results have been obtained with concentrations of between 85% and 90%.

Changes in the relative proportions of borate and acid material also have a considerable effect upon the results obtained in the paper making operation and more particularly upon the consistency and characteristics in the aqueous solution formed when the combination is added to water and cooked. The borate tends to impart to the cooked solution a heavy body, high film strength and stringiness. The acid material reduces the "ropiness" of the cooked solution, imparts a long stringy character thereto and reduces its viscosity to a level that makes handling of the solution practicable.

It has generally been found desirable to adjust the relative proportions of locust bean gum, borate and acid material so that the dispersion thereof in water before cooking or the solution thereof after cooking will have a pH between about 3 and 10. The lower limit of the pH range is determined by the characteristics of the particular locust bean gum in the combination and particularly by its ability to "open" or become gelatinized when cooked. If the pH is reduced to a value below about 3, it becomes extremely difficult, and in some cases impossible, to gelatinize the locust bean gum by cooking. The upper limit of the pH range is determined by the viscosity of the cooked solution. It is essential in practice that the cooked solution be not so viscous that it cannot readily be transferred from a cooking vessel to a supply vessel or from a supply vessel to the head box, fan pump or stock regulator box. Reduction of the viscosity simply by diluting the solution with water is not practicable because that would involve increasing the capacity of the cooking vessel or supply tank and of the pumping equipment utilized to add the cooked solution to the furnish. It is preferable therefore to maintain the pH between about 3 and 10 so that the cooked solution will not be too viscous and at the same time not too acid to prevent or inhibit gelatinization of the locust bean gum. While it is possible to carry out the process of this invention at either extreme pH value, it has been found that optimum results are obtained by maintaining the pH at about 8.0 to 8.2. Within this more limited range, the locust bean gum will become gelatinized quite readily and the viscosity of the cooked solution is sufficiently low to permit easy transference of the cooked solution from a supply source to the head box, stock regulator box, fan pump, or to any other point at which the combination is added to the furnish. Satisfactory viscosity and gelatinization conditions are normally obtained by maintaining the ratio of borate to acid material at between about 1:1 and 3:1 and preferably at about 2:1.

A mixture that has been found to be particularly successful is one containing 85% by weight of locust bean gum, 10% by weight of borate and 5% by weight of acid material. When a handful of this mixture is simply dumped into cold water, it at first floats on the surface. Within a few seconds, however, the mass of material breaks up into smaller portions which fall to the bottom until all of it has left the surface of the water. Simple stirring of the water will thereupon form a uniform dispersion of the material which, upon being cooked to a temperature of about 200° F., will form a viscous, stringy and transparent solution.

By way of contrast, when straight locust bean gum is dumped into cold water, only a small portion of it may fall to the bottom and most of the locust bean gum remains floating on the surface. The outer portions of the mass apparently absorb water, swell and become sticky so as to form a coating that denies access of water to the interior of the mass. Vigorous stirring fails to produce a uniform distribution of the gum throughout the water and cooking thereof at 200° F. results in a syrupy mass containing lumps which must be removed before it can be added to the furnish.

When it is desired to employ mixtures having concentrations of locust bean gum that are less than about 80%, starch may be added to make up for the lack of locust bean gum. Thus, for example, favorable results have been obtained with a mixture consisting of 68% locust bean gum, 17% starch, 10% borate and 5% acid material. Small amounts of oxidizing agents, such as barium peroxide and sodium perborate may be added to thin out the solution prepared when the combination is dissolved in water.

The borate may be any suitable borate such as, for example, sodium tetraborate (borax) and sodium metaborate.

The acid material may be glyoxal, pyruvic aldehyde, ammonium chloride, citric acid, boric acid or aluminum sulfate or a combination of one or more of said materials. The presence of glyoxal or ammonium chloride in the combination is particularly desirable because they both promote an extremely rapid and facile dispersion of the mixture in cold water. A mixture consisting of 85% locust bean gum, 10% borax and 5% glyoxal, for example, will readily and completely disperse in water at room temperature in as little as 7 seconds. If ammonium chloride is used instead of the glyoxal, the mixture will disperse under the same conditions and in the same manner in as little as 9.6 seconds. Glyoxal therefore is preferable from the standpoint of rapidity of dispersion whereas ammonium chloride is preferable from the standpoint of economy inasmuch as the price of ammonium chloride is much lower than that of glyoxal.

Aqueous solutions containing from about ¼% up to about 5% by weight of solute may readily be prepared.

In accordance with the preferred practice, a

1% solution of the mixture is made by adding it, in the form of a dry powder, to one half the required amount of water while the water is cold, then cooking to 200° F. and finally adding the remaining water required to produce a 1% solution. This solution is then added to the pulp in the head box, at the fan pump or in the regulator box at a rate sufficient to add from about 1 to 20 or 30 lbs. of the mixture, based on the dry weight thereof, to a ton of furnish, likewise based on the dry weight thereof. As in ordinary paper making processes, the concentrated stock, consisting of a maximum of approximately 4% solids, is diluted at the fan pump to a much more dilute state, e. g., 0.5%.

The addition of a solution of locust bean gum, borate and acid material to a paper stock permits increasing the freeness of the stock, reducing the power consumption in the refining phases and the steam consumption in the dryer section, all of which makes possible an increase in the speed at which the paper is run off, and generally improves the characteristics of the paper produced at a given set of machine conditions.

A number of typical formulae are listed in the tables below, the numerals therein referring to percentages by weight.

TABLE 1

| Formula No. | 1 | 2 | 3 | 4 | 5 | 6 | 7 | 8 | 9 | 10 | 11 |
|---|---|---|---|---|---|---|---|---|---|---|---|
| Locust Bean Gum | 85 | 87 | 90 | 90 | 85 | 85 | 80 | 70 | 60 | 50 | 84 |
| Borax | 10 | 7 | 5 | 6 | 10 | 10 | 12 | 20 | 26.6 | 33.3 | 11 |
| Glyoxal | 5 | 6 | 5 | 4 | | | 5 | 5 | 5 | 5 | |
| Pyruvic Aldehyde | | | | | 5 | | | | | | 2 |
| Ammonium Chloride | | | | | | 5 | 3 | 5 | 8.4 | 11.7 | 3 |

TABLE 2

| Formula No. | 12 | 13 | 14 | 15 | 16 | 17 | 18 | 19 | 20 | 21 |
|---|---|---|---|---|---|---|---|---|---|---|
| Locust Bean Gum | 85 | 84 | 96 | 84 | 68 | 84.9 | 85 | 85 | 84 | 85 |
| Powdered Potato Starch | | | | | 17 | | | | | |
| Borax | 10 | 10 | 2 | 11 | 10 | 10 | 10 | | 11 | 11 |
| Sodium Metaborate | | | | | | | | 10 | | |
| Glyoxal | | 5 | 1 | 2 | 5 | 5 | | 5 | 2 | |
| Citric Acid | | | | | | | 5 | | | |
| Boric Acid | | | | | | | | | 3 | |
| Aluminum Sulfate | 5 | | | 3 | | | | | | 4 |
| Barium Peroxide | | 1 | | | | | | | | |
| Sodium Perborate | | | 1 | | | | | | | |
| "Dowicide A" | | | | | | 0.1 | | | | |

TABLE 3

| Formula No. | 22 | 23 | 24 | 25 |
|---|---|---|---|---|
| Locust Bean Gum | 85 | 84 | 85 | 84 |
| Borax | 10 | 11 | 11 | 11 |
| Glyoxal | | 2 | | |
| Ammonium Chloride | 5 | 3 | 4 | |
| Boric Acid | | | | 5 |

In order to further illustrate the invention without, however, intending to limit its scope thereto, the following examples are included.

Example 1

Four batches of locust bean gum, borax and glyoxal, corresponding to formulae Nos 1, 2, 3, and 4 of Table 1, were made up on a laboratory scale. A 1% aqueous solution of each batch was formed by dispersing one part by weight of the dry mixture in about 50 parts by weight of water, cooking the resulting dispersion to 200° F. and then adding sufficient additional water to bring the concentration of solids down to 1% by weight. The temperature of these solutions was maintained at about 180° F.

A 1% solution of locust bean gum alone was prepared in a similar manner.

A number of paper making runs, on a laboratory scale, corresponding to the number of solutions prepared, were then made. In each run, one of the prepared solutions was added to the furnish at a rate of 10 lbs., based on the dry weight, of solution to a ton of furnish, likewise based on the dry weight.

Two sheets each having a weight of 2.8 grams were selected from each run to eliminate test errors due to variations in the weight of the sheets produced and each sheet selected was subjected to ten mullen tests. The averages of the twenty mullen tests in each run are tabulated below:

| Formula No. | Average Mullen Count |
|---|---|
| 1 | 33.33 |
| 2 | 32.3 |
| 3 | 32.05 |
| 4 | 32.0 |
| Locust Bean Gum Alone | 30.85 |

Example 2

Dry mixtures corresponding to formulae Nos. 7, 8, 9, 10, 11, 13, 14, 16, 18, 19 and 20 were made up, on a laboratory scale into 1% aqueous solutions by dispersing one part by weight of each dry mixture in about 50 parts by weight of water, cooking the resulting dispersions to 200° F. and then adding sufficient additional water to bring the concentration of solids down to 1% by weight. The temperature of these solutions was maintained at about 180° F.

A number of paper making runs on a laboratory scale were then made. In each run, a number of blank and modified paper sheets were made. The blank sheets were made without adding a locust bean gum containing solution to the furnish and the modified sheets were made by adding one of the prepared solutions at a rate of 10 lbs., based on the dry weight, of solution to a ton of furnish, likewise based on the dry weight.

Two blank sheets and two modified sheets each having a weight of 2.8 grams were selected from each run to eliminate test errors due to variations in the weight of the sheets produced and each sheet selected was subjected to ten mullen tests. The averages of the twenty mullen tests conducted on each set of two sheets are tabulated below:

| Formula No. | Blank Sheets | Modified Sheets |
|---|---|---|
| 7 | 40.65 | 46.0 |
| 8 | 40.65 | 44.9 |
| 9 | 37.5 | 45.4 |
| 10 | 37.5 | 44.6 |
| 11 | 42.7 | 45.9 |
| 13 | 43.5 | 45.7 |
| 14 | 44.5 | 47.7 |
| 16 | 41.6 | 45.4 |
| 18 | 48.9 | 52.4 |
| 19 | 43.1 | 45.2 |
| 20 | 42.7 | 48.5 |

*Example 3*

Dry mixtures corresponding to formulae Nos. 12 and 21 were made up, on a laboratory scale into 1% aqueous solutions by dispersing one part by weight of each dry mixture in about 50 parts by weight in water, cooking the resulting dispersions to 200° F. and then adding sufficient additional water to bring the concentration of solids down to ¼ to ½ per cent by weight.

A number of paper making runs on a laboratory scale were then made. In each run, a number of blank and modified paper sheets were made. The blank sheets were made without adding a locust bean gum containing solution to the furnish and the modified sheets were made by adding one of the cooked solutions, at a temperature of approximately 100° F. and at a rate of 10 lbs., based on the dry weight, of solution to a ton of furnish, likewise based on the dry weight.

Two blank sheets and two modified sheets each having a weight of 2.97 plus or minus .03 gram were selected from each run to eliminate test errors due to variations in the weight of the sheets produced and each sheet selected was subjected to ten mullen tests. The averages of the twenty mullen tests conducted on each set of two sheets are tabulated below:

| Formula No. | Blank Sheets | Modified Sheets |
|---|---|---|
| 12 | 44.2 | 48.9 |
| 21 | 46.1 | 51.6 |

*Example 4*

Dry mixtures corresponding to formulae Nos. 22, 23 and 24 were made up, on a laboratory scale, into 1% aqueous solutions by dispersing one part by weight of each dry mixture in about 50 parts by weight of water, cooking the resulting dispersions to 200° F. and then adding sufficient additional water to bring the concentration of solids down to 1% by weight.

A number of blank and modified paper sheets were made and tested in the manner described in Example 3. In addition, modified sheets were made by adding the prepared solution at a rate of 5 lbs., based on the dry weight, of solution to a ton of furnish, likewise based on the dry weight. These modified sheets were likewise subjected to mullen tests.

Two blank sheets and two modified sheets, each having a weight of 3.0 plus or minus .01 grams were selected from each run to eliminate test errors due to variations in the weight of the sheets produced and each sheet selected was subjected to ten mullen tests. The average of the twenty mullen tests conducted on each set of two sheets and the increases in per cent mullen obtained with the modified sheets are tabulated immediately below:

| Formula No. | Blank Sheets | Modified Sheets | | | |
|---|---|---|---|---|---|
| | | 10 lbs./ton | | 5 lbs./ton | |
| | | Mullen | Percent Inc. | Mullen | Percent Inc. |
| 22 | 47.2 | 52.65 | 11.6 | 50.7 | 7.4 |
| 23 | 47.2 | 52.55 | 11.4 | 50.9 | 7.8 |
| 24 | 47.2 | 53.05 | 12.4 | | |

It is to be understood that innumerable modifications will readily occur to those skilled in the art upon reading this description. All such modifications are intended to be included within the scope of the present invention as defined in the appended claims.

We claim:

1. In a process of making paper from an aqueous suspension of fibrous material, the step which comprises adding, to said suspension, after all operations designed to substantially modify the fibrous constituents by mechanical means are completed and prior to the formation of the web, an aqueous solution of a cooked mixture of locust bean gum, a sodium borate and a salt selected from the group consisting of ammonium chloride and aluminum sulfate, the gum being present in the mixture in an amout from at least about equal to the combined weight of borate and salt to about 96% of the mixture, the relative proportions of the borate to the salt ranging from about 3:1 to 1:1 by weight, and the amount of cooked mixture of gum, borate and salt in the solution ranging from an appreciable amount up to about 30 lbs. per ton of fibrous material in the aqueous suspension, both based on the dry weight thereof.

2. In a process of making paper from an aqueous suspension of fibrous material, the step which comprises adding, to said suspension, after all operations designed to substantially modify the fibrous constituents by mechanical means are completed and prior to the formation of the web, an aqueous solution of a cooked mixture containing from 50 to 96 parts by weight of locust bean gum, from 2 to 35 parts by weight of a sodium borate and from 1 to 20 parts by weight of a salt selected from the group consisting of ammonium chloride and aluminum sulfate, the amount of cooked mixture of gum, borate and salt in the solution ranging from an appreciable amount up to about 30 lbs. per ton of fibrous material in the aqueous suspension, both based on the dry weight thereof.

3. In a process of making paper from an aqueous suspension of fibrous material, the step which comprises adding, to said suspension, after all operations designed to substantially modify the fibrous constituents by mechanical means are completed and prior to the formation of the web, an aqueous solution of a cooked mixture containing from 85 to 90 parts by weight of locust bean gum, from 5 to 10 parts by weight of a sodium borate and from 2 to 6 parts by weight of a salt selected from the group consisting of ammonium chloride and aluminum sulfate, the amount of cooked mixture of gum, borate and salt in the solution ranging from an appreciable amount up to about 30 lbs. per ton of fibrous material in the aqueous suspension, both based on the dry weight thereof.

NAT FRISCH.
FRANK J. SWEENEY.

References Cited in the file of this patent

UNITED STATES PATENTS

| Number | Name | Date |
|---|---|---|
| 60,635 | Irving et al. | Dec. 18, 1866 |
| 1,106,335 | Pinel | Aug. 4, 1914 |
| 1,280,861 | Satow | Oct. 8, 1918 |
| 1,334,356 | Dunham | Mar. 23, 1920 |
| 1,448,847 | Kaiser | Mar. 20, 1923 |
| 1,839,346 | Seferiadis | Jan. 5, 1932 |
| 2,144,522 | Braun | June 17, 1939 |
| 2,258,628 | Smith | Oct. 14, 1941 |
| 2,336,367 | Osborne | Dec. 7, 1943 |

FOREIGN PATENTS

| Number | Country | Date |
|---|---|---|
| 508,135 | Great Britain | June 27, 1939 |

OTHER REFERENCES

Broadbent et al., Tech. Supplement to World's Paper Trade, Review, June 27, 1941, pp. 49–56.

Mason, Chemical Industries, January 1944, pp. 66 and 67.

The Determination of Hydrogen Ion by Clark, published by Williams and Wilkins Co., Baltimore, Md. (1927), chapter 6 particularly pp. 108, 110 and 112–117.